United States Patent
Abraham

(10) Patent No.: US 11,520,035 B2
(45) Date of Patent: Dec. 6, 2022

(54) COHERENCE CHANGE DETECTION TECHNIQUES

(71) Applicant: Elta Systems Ltd., Ashdod (IL)

(72) Inventor: Michael Abraham, Rishon le Zion (IL)

(73) Assignee: ELTA SYSTEMS LTD., Ashdod (IL)

( * ) Notice: Subject to any disclaimer, the term of this patent is extended or adjusted under 35 U.S.C. 154(b) by 863 days.

(21) Appl. No.: 16/299,260

(22) Filed: Mar. 12, 2019

(65) Prior Publication Data

US 2019/0285741 A1   Sep. 19, 2019

(30) Foreign Application Priority Data

Mar. 14, 2018 (IL) .......................... 258119

(51) Int. Cl.
  *G01S 13/90* (2006.01)
  *G06V 10/40* (2022.01)
  (Continued)

(52) U.S. Cl.
  CPC .......... *G01S 13/9023* (2013.01); *G06V 10/40* (2022.01); *G01S 15/8904* (2013.01); *G06V 10/467* (2022.01)

(58) Field of Classification Search
  CPC ... G01S 13/9023; G01S 15/8904; G06K 9/46; G06K 2009/4666
  See application file for complete search history.

(56) References Cited

U.S. PATENT DOCUMENTS 8,692,704 B1    4/2014 Perkins et al.
9,239,384 B1 *  1/2016 Chow ................... G06K 9/46
(Continued)

FOREIGN PATENT DOCUMENTS

CN    103366365 A    10/2013
FR    2983307 A1 *  5/2013  ......... G01S 13/9023
(Continued)

OTHER PUBLICATIONS

Preiss, M. & Stacy, N. J. S. 2006. "Coherent Change Detection: Theoretical Description and Experimental Results", DSTO-TR-1851, Defence Science and Technology Organisation, Australian Department of Defence.
(Continued)

*Primary Examiner* — Vladimir Magloire
*Assistant Examiner* — Nazra Nur Waheed
(74) *Attorney, Agent, or Firm* — Browdy and Neimark, P.L.L.C.

(57) ABSTRACT

Techniques for determining coherency between composite images having phase and amplitude components are disclosed. The coherency can be determined based on the amplitude components of the images, by providing first and second amplitude images indicative of amplitude values of pixels of a respective first and second composite images, applying to each of the first and second amplitude images a first directional derivative operator and a second directional derivative operator, thereby generating for each of the amplitude images respective first directional derivative image and second directional derivative image thereof, and generating a first coherency map based at least on the directional derivative images of the first and second amplitude images. The first coherency map is indicative of decorrelation between the first and second composite images.

18 Claims, 7 Drawing Sheets

(51) Int. Cl.
  *G01S 15/89* (2006.01)
  *G06V 10/46* (2022.01)

(56) References Cited

U.S. PATENT DOCUMENTS

| | | | | |
|---|---|---|---|---|
| 2005/0206660 | A1* | 9/2005 | Kanai | G09G 3/2081 345/691 |
| 2007/0025720 | A1* | 2/2007 | Raskar | G06V 10/60 396/213 |
| 2014/0369623 | A1* | 12/2014 | Fletcher | G06T 5/10 382/275 |
| 2015/0269745 | A1* | 9/2015 | Klimer | G06T 7/194 382/103 |
| 2016/0131767 | A1* | 5/2016 | Fletcher | G01T 7/00 250/336.1 |

FOREIGN PATENT DOCUMENTS

| | | |
|---|---|---|
| WO | 2012/038705 A1 | 3/2012 |
| WO | 2016/005738 A1 | 1/2016 |

OTHER PUBLICATIONS

Milisavljević, N., et al. 2010. "Detecting Human-Induced Scene Changes Using Coherent Change Detection in SAR Images", ISPRS TC VII Symposium, XXXVIII(7B): 389-394.

Hoshino, T., et al. 2010. "Coherent change detection with complex logarithm transformation on SAR imagery", Proceedings of SICE Annual Conference 2010: 286-290.

Stojanovic, I. & Novak, L. 2013. "Algorithms improve synthetic aperture radar coherent change detection performance", SPIE Newsroom: DOI 10.1117/2.1201307.004889.

Martone, A., et al. 2011. "Coherent and non-coherent change detection for through the wall sensing of moving targets", Radar Conference (RADAR) 2011: 256-261.

Ranney, K. & Soumekh, M. 2005 "Adaptive change detection in coherent and noncoherent SAR imagery", Radar Conference (RADAR) 2005:195-200.

Bouaraba, A., et al. 2012. "Robust Techniques for Coherent Change Detection Using Cosmo-Skymed SAR Images", Progress in Electromagnetics Research M, 22: 219-232.

Schmitt, A., et al. 2014. "An Innovative Curvelet-only-Based Approach for Automated Change Detection in Multi-Temporal SAR Imagery", Remote Sensing, 6(3): 2435-2462.

Xiaoliang, S., et al. 2015. "Change Detection Using L0 Smoothing and Superpixel Techniques", Serious Games: 600-611.

* cited by examiner

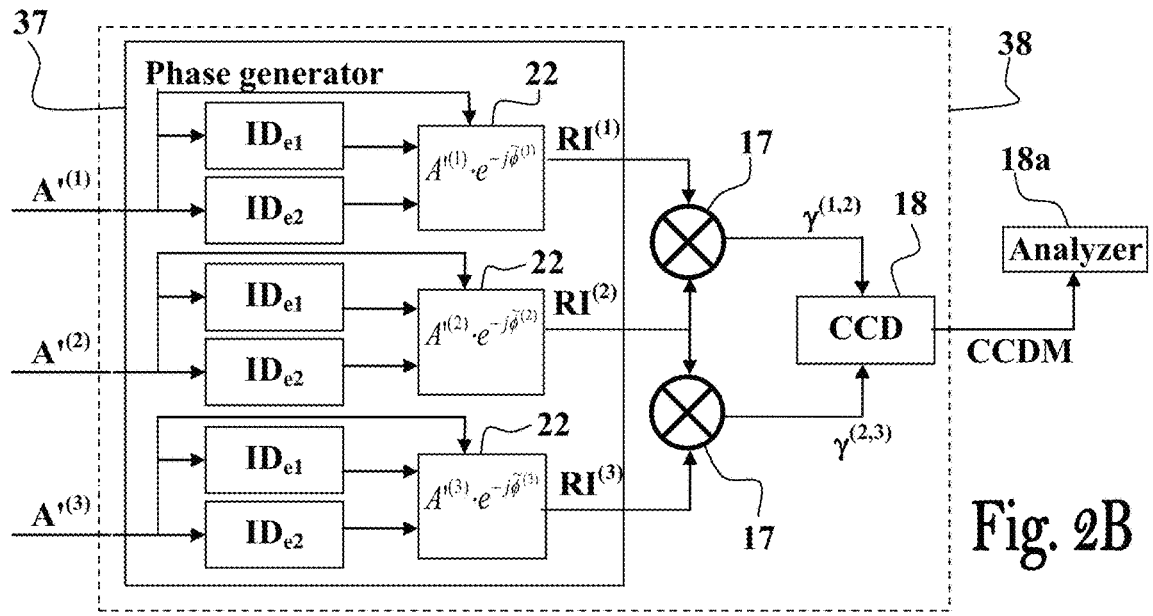
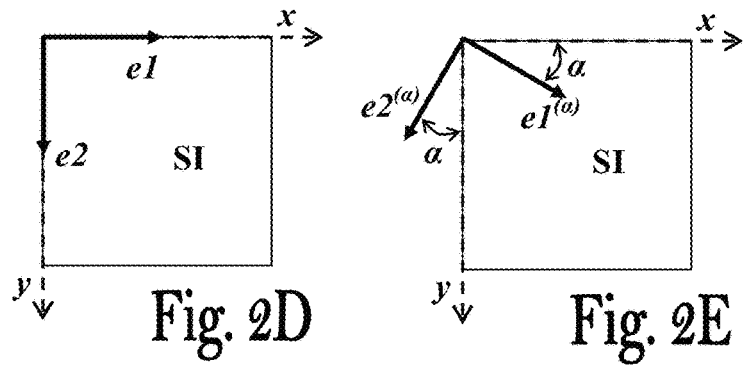
Fig. 2D    Fig. 2E
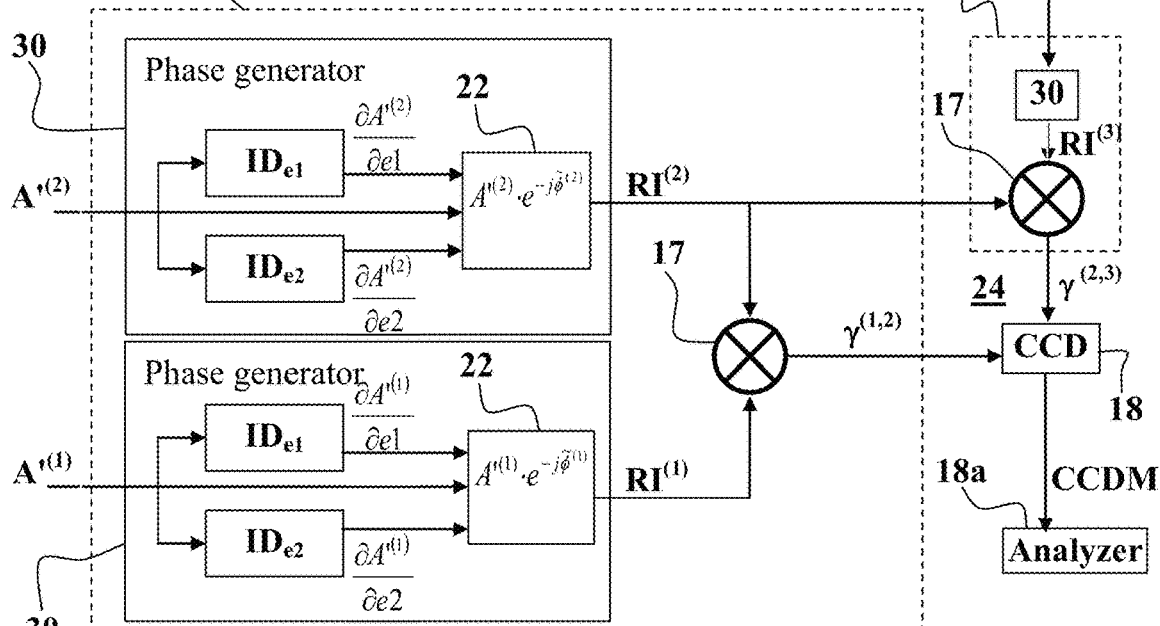
Fig. 2C

US 11,520,035 B2

COHERENCE CHANGE DETECTION TECHNIQUES

TECHNOLOGICAL FIELD

The present invention generally relates to change detection techniques, particularly change detection in interferometric SAR images (InSAR).

BACKGROUND

Change detection techniques are used to identify differences in the state of terrains/objects/phenomenon by comparison of datasets (images) indicative of temporal states as acquired at different time instances. Automated change detection use change detection to analyze images of a repeatedly monitored area (e.g., region of interest surveillance such as port and harbor security, boarder area monitoring, and suchlike), and thereby increase detection capability and reduce human workload. One particular such technique is known as CCD (Coherent Change Detection) and it is used in remote sensing applications to detect very small and subtle changes on the ground. In this case subtle changes are on the order of some fraction of the wavelength used.

Some examples of applications employing change detection include remotely sensed satellite/airborne/seaborne imagery (detection of terrain changes e.g., using synthetic aperture radar SAR, synthetic aperture sonar—SAS, or suchlike) medical imaging (e.g., optical coherence tomography), industry and driver assistance systems.

Interferometry utilizes wave signals (e.g., electromagnetic, sound) reflected from objects to collect information thereabout, that can be used to measure small displacements/changes and surface/object irregularities, mainly due to the phase information present in the full interferometric SAR image (SI). The measured signals comprise information about the amplitude and phase of the return signals, and thus each pixel $SI_{(n,m)}$ (where n and m are positive indexing integers) of an interferometric SAR image (SI) can be presented as a complex number (a+jb), where a and b are real numbers and $j=\sqrt{-1}$ is the imaginary unit, or as any suitable amplitude-phase representation $(A,\phi)$, where A and $0<\phi<2\pi$ are real numbers indicating the measured amplitude and phase, respectively.

Thus, SIs are often decomposed into an amplitude image $A_{(n,m)}$ and phase image $\phi_{(n,m)}$ components. This type of images having an amplitude component/image and a phase component/image, are generally referred to herein as composite images, which can be also formed into a complex image wherein each pixel has real and imaginary components. The composite images in embodiments disclosed herein are coherent images that are produced using a coherent signal source (e.g., radar signal). For example, in SAR and SAS imaging the images are acquired using coherent transmitter and receiver units, and thus the acquired images are referred to as coherent images.

SAR and SAS systems are used in remote sensing to generate images of objects, such as earth terrains, that can be used to generate three dimensional representations of the objects by interferometric techniques, and for detection of subtle changes on the surface of those objects. These systems are typically mounted on a moving platform (e.g., aircraft/spacecraft, watercraft) and designed to generate composite images of side-scans acquired during the motion of the platform over a target region/object. The composite images are acquired by transmission of successive wave pulses towards a target area terrain/object, and the echo of the sequentially transmitted pulses are measured and submitted to a SAR image generation process that generates the final SAR composite image. SAR Interferometry typically deals with pairs of such SAR images in order to assess the ground height variations and/or detect subtle changes on the observed target area region.

Interferometry and coherent change detection techniques known from the patent literature are briefly described below.

U.S. Pat. No. 9,239,384 presents various technologies for identifying manmade and/or natural features in a radar image. Two radar images (e.g., single polarization SAR images) can be captured for a common scene. The first image is captured at a first instance and the second image is captured at a second instance, whereby the duration between the captures are of sufficient time such that temporal decorrelation occurs for natural surfaces in the scene, and only manmade surfaces, e.g., a road, produce correlated pixels. A LCCD image comprising the correlated and decorrelated pixels can be generated from the two radar images. A median image can be generated from a plurality of radar images, whereby any features in the median image can be identified. A superpixel operation can be performed on the LCCD image and the median image, thereby enabling a feature(s) in the LCCD image to be classified.

In U.S. Pat. No. 8,692,704 a set of co-registered coherent change detection (CCD) products is produced from a set of temporally separated synthetic aperture radar (SAR) images of a target scene. A plurality of transformations are determined, which transformations are respectively for transforming a plurality of the SAR images to a predetermined image coordinate system. The transformations are used to create, from a set of CCD products produced from the set of SAR images, a corresponding set of co-registered CCD products.

International Patent Publication No. WO 2016/005738 describes method and system of surveillance using a synthetic aperture radar system, in which a plurality of datasets are captured, each dataset comprising a plurality of images captured at a respective plurality of imaging positions along a path relative to an area of interest. Each image of a dataset is compared with a respective corresponding image of the preceding dataset to produce respective coherent change detection images for each of said plurality of imaging positions. Then, the coherent change detection image for each imaging position is compared with the change detection image for the immediately preceding imaging position on said path to produce incoherent change detection images representative of changes between consecutive imaging positions along said path.

General Description

Real time change detection in SAR imaging applications typically require transmission of acquired SAR composite images (CI) from a moving platform to a processing system, for identification of changes introduced therein relative to one or more SAR CIs of the same terrain/region of interest (ROI) acquired beforehand with substantially the same imaging parameters. However, due to the huge sizes of SAR CIs (around 64 Mbytes to 0.4 Gbytes) and their acquisition rates (about one CI is typically acquired per 1-30 seconds i.e., requiring data transmission rates of up to 400 MB/sec), these requirements presents a significant bottleneck in real time systems, particularly when the CIs are acquired by a remote aircraft/spacecraft/watercraft and transmitted to a ground control system for analysis.

This difficulty is typically resolved by increasing data communication bandwidths to enable high transmission rates of the amplitude and phase information of the acquired SAR CIs. In another possible solution the change detection is performed onboard the moving platform, which requires installing a database of previously acquired SAR CIs, and a suitable processing system, on the moving/flying platform. However, in both cases additional equipment should be mounted on the moving/flying platform, in addition to the equipment customarily provided by the manufacturers, which increases costs, weight and energy consumption, and thus cause such applications to become impractical and/or overly expensive.

In the following sections of the description SAR composite images of the same ROI acquired at different times in a chronological sequence with substantially the same imaging parameters, will be referred to as CIs, or $CI^{(i)}$ (where i>0 is an indexing integer) when referring to a time sequence of CIs.

The inventor hereof found out that an alternative CCD processing can be carried out using only the amplitude image data $A_{(n,m)}$ of SAR CIs i.e., without using the phase image data $\phi_{(n,m)}$ of the CI, and without substantial deterioration in results relative to standard CCD processing. This is achieved by processing the amplitude image $A_{(n,m)}$ of each CI alone and estimating the phase data image of the CI from the amplitude image $A_{(n,m)}$. The estimated phase data image $\tilde{\phi}_{(n,m)}$ (also referred to herein as pseudo phase) is then combined with the original amplitude image data (e.g., $A_{(n,m)}$ of the CI to compose a restored image (RI), $RI = A_{(n,m)} \cdot e^{-j\tilde{\phi}_{(n,m)}}$. The composed RI can be then used to generate coherency maps of the imaged ROI, by any suitable CCD process, utilizing one or more other RIs, and/or CIs, having at least the original amplitude image data $A_{(n,m)}$ of CIs acquired at different times, but with substantially the same imaging parameters.

More particularly, the coherency map $\gamma^{(1,2)}$ of two SAR composite images $CI^{(1)}$ and $CI^{(2)}$ is generated in some embodiments, by determining from the amplitude data of each image, $A^{(1)}$ and $A^{(2)}$, a respective estimation of its phase data, $\tilde{\phi}^{(1)}$ and $\tilde{\phi}^{(2)}$ composing respective RIs for the images, $RI^{(1)} = A^{(1)} \cdot e^{-j\tilde{\phi}^{(1)}}$ and $RI^{(2)} = A^{(2)} \cdot e^{-j\tilde{\phi}^{(2)}}$, and cross-correlating ($\otimes$) the RIs (i.e., using the original amplitude data of the images and the estimation of their phase data) to generate the coherency map $\gamma^{(1,2)} = (A^{(1)} \cdot e^{-j\tilde{\phi}^{(1)}}) \otimes (A^{(2)} \cdot e^{-j\tilde{\phi}^{(2)}})$ Following the above procedure for only two successive images, CCD can be carried out for a sequence of at least three composite images, $CI^{(1)}$ $CI^{(2)}$ and $CI^{(3)}$, by using the original amplitude data image and the estimated phase data image of the acquired CIs to compose respective three RIs, $RI^{(1)}$ $RI^{(2)}$ and $RI^{(3)}$, and use the composed RIs to generate two coherency maps ($\gamma^{(1,2)}$ and $\gamma^{(2,3)}$) for two different pairs of the images, and for detecting changes between the two coherency maps, thus generating data indicative of subtle changes occurred in the ROI/terrain e.g., CCD.

Optionally, and in some embodiments preferably, the phase estimation comprises generating from the amplitude data image $A^{(i)}$ of each $CI^{(i)}$ a respective spatial gradient image $$\nabla A^{(i)} = \left( \frac{\partial A^{(i)}}{\partial x}, \frac{\partial A^{(i)}}{\partial y} \right),$$

and estimating the phase image $\tilde{\phi}_{(n,m)}^{(i)}$ of the $CI^{(i)}$ by computing the angle between the spatial directional derivatives $$\frac{\partial A^{(i)}}{\partial x} \text{ and } \frac{\partial A^{(i)}}{\partial y}$$

components at each pixel $\nabla A^{(i)}_{(n,m)}$ i.e., $$\tilde{\phi}_{(n,m)}^{(i)} = tg^{-1}\left( \frac{\partial A_{(m,n)}^{(i)}}{\partial y} \bigg/ \frac{\partial A_{(m,n)}^{(i)}}{\partial x} \right) = tg^{-1}(A_y^{(i)}/A_x^{(i)}).$$

Thus, in some embodiments, the change detection comprises generating for each amplitude image $A^{(i)}$ of a $CI^{(i)}$ a respective restored image $RI^{(i)}$, indicative of the pseudo phase $\tilde{\phi}^{(i)}$. Each restored image $RI^{(i)}$ can be generated from the amplitude image data $A^{(i)}$ of the respective $CI^{(i)}$ and the estimated phase $\tilde{\phi}^{(i)}$ can be determined from the directional derivatives of the amplitude image $A^{(i)}$, as follows:

$$RI(i) = A^{(i)} \cdot e^{-j \cdot tg^{-1}(A_y^{(i)}/A_x^{(i)})}.$$

Different pairs of generated restored images $RI^{(q)}$ and $RI^{(k)}$, of respective composite images $CI^{(q)}$, and $CI^{(k)}$ can be thus used to generate respective coherency maps $\gamma^{(q,k)}$ by cross-correlating the different pairs of the restored images $RI^{(q)}$ and $RI^{(k)}$ (where q≠k, q>0 and k>0 are indexing integers). Optionally, and in some embodiments preferably, different consecutive pairs of the restored images with respect to their acquisition time intervals are used i.e., k=q±1. The coherency maps $\gamma^{(q,k)}$ and $\gamma^{(k,k+1)}$ of such consecutive pairs of the restored images $RI^{(q)}$ and $RI^{(k)}$ can be then used to conduct standard CCD, to yield a change detection map showing fine details of temporal decorrelation and/or deformations between the original composite images $CI^{(q)}$, and $CI^{(k)}$.

It is noted that although the change detection techniques disclosed herein are particularly useful for SAR CIs, these techniques are not limited to composite images generated by SAR imaging systems. Embodiment of the subject matter disclosed herein may be used with any type of composite image such as generated in SAS, magnetic resonance imaging, optical interferometry, and suchlike applications.

One inventive aspect of the subject matter disclosed herein relates to a computer implemented method of processing composite images (also known as coherent images) having phase and amplitude components, particularly for determining coherency between the composite images, wherein the coherency is determined based only on the amplitude components of the images. The method comprising providing first and second amplitude images (also referred to herein as original amplitude images) indicative of amplitude values of pixels of a respective first and second composite images, such as SAR images, having substantially same imaging parameters, applying to each of the first and second amplitude images a first spatial/directional derivative operator and a second spatial/directional derivative operator, to thereby generate respective first directional derivative image and second directional derivative image for said first amplitude image, and respective first directional derivative image and second directional derivative image for said second amplitude image, and generating a first coherency map based at least in part on the directional derivative images of the first and second amplitude images. Optionally, and in some embodiments preferably, the first coherency map is generated from the directional derivative images and their respective amplitude images. The first coherency map is thus indicative of the decorrelation between the first and second composite images.

Optionally, and in some embodiments preferably, a restored composite image is constructed for each amplitude image based on the directional derivative images generated from its amplitude image. The restored composite image comprises in some embodiments the original amplitude image of an original composite image, and an estimated phase image generated from first directional derivative image and second directional derivative image of the original amplitude image. The coherency map can be thus generated from the restored composite images by cross-correlating two restored composite images generated from original amplitude images of two original composite images having substantially same imaging parameters.

Accordingly, in some embodiments the first directional derivative image and the second directional derivative image of each amplitude image of a respective composite image can be used to estimate the phase image of the respective composite image. This way, coherency maps can be generated from the restored composite images using the phase image estimated from amplitude image of each composite image and the respective amplitude image, without requiring the original phase image data of the composite image.

In some embodiments the method comprises providing at least one additional amplitude image indicative of amplitude values of pixels of at least one additional composite image having substantially same imaging parameters of the first and second composite images, applying the first directional derivative operator and the second directional derivative operator to the at least one additional amplitude image, to thereby generate respective first directional derivative image and second directional derivative image thereof, and generating at least one additional coherency map based at least in part on the directional derivative images of the at least one additional amplitude image and at least in part on the directional derivative images of the first or of the second amplitude image. The method can thus comprise constructing an additional restored composite image for the at least one additional amplitude image, and generating the at least one additional coherency map from the additional restored composite image and the restored composite image generated for the first amplitude image or for the second amplitude image. The at least one additional coherency map is thus being indicative of decorrelation between the at least one additional composite image and at least one of the first and second composite images.

Optionally, the at least one additional composite image is acquired at a time interval not overlapping with time intervals of acquisition of the first and second composite images.

Optionally, and in some embodiments preferably, the method comprises generating a coherence change detection map (CCDM) from the first coherency map and the at least one additional coherency map. The coherence change detection map thus being indicative of decorrelation between the first, second, and third, composite images, and substantially cancel out areas exhibiting high decorrelation in all of the composite images. The method can thus comprise processing and analyzing the coherence change detection map to identify regions and/or objects and/or events of interest therein.

In possible embodiments the first directional derivative operator and the second directional derivative operator are directional derivative operators associated with different spatial image plane directions. In some embodiments, the directions of the directional derivative operators are orthogonal, such as in case where the directions of the directional derivative operators are on, or aligned with, horizontal and vertical axes of their respective amplitude images.

Optionally, and in some embodiments preferably, the generation of at least one of the coherency maps comprises computing complex cross-correlation. The method comprises in some embodiments spatially registering at least the amplitude components of the composite images (e.g., either coherent SAR or SAS images) with respect to one another.

The method can comprise applying a plurality of pairs of the first directional derivative operator and the second directional derivative operator to the amplitude image of at least one of the composite images, each of the pair of directional derivative operators being applied in different image directions, and generating a coherency map based on said plurality of pairs of the first directional derivative operator and the second directional derivative operator. The image directions of each pair of the directional derivative operators can be orthogonal.

Another inventive aspect of the subject matter disclosed herein relates to a system for determining decorrelation between two or more composite images, wherein said decorrelation is determined based only on the amplitude components of the images. The system comprises at least two phase estimating units, each configured and operable to generate an estimated phase image from at least two different directional derivatives of an amplitude image of one of the two or more composite images, and at least one coherence unit configured and operable to generate coherence data indicative of coherency between said two or more composite images, based at least in part on the estimated phase images of the amplitude images. The coherence data being thus indicative of decorrelation between the two or more composite images.

In some embodiments the system comprises three of the phase estimating units for generating three estimated phase images from respective three amplitude images of three different composite images, and two of the coherence units, each configured and operable to generate data indicative of coherency between a different pair of the composite images based at least in part on their respective estimated phase images. The system can thus comprise at least one change detection unit configured and operable to determine changes between at least two of the three different composite images based on the data generated by the two coherence units, and substantially cancel out areas exhibiting high decorrelation in all of the composite images.

Optionally, and in some embodiments preferably, each phase estimation unit comprises a first directional differentiating unit and a second directional differentiating unit configured and operable to generate respective first directional derivative image and second directional derivative image of an amplitude image. A composite image restoring unit associated with each phase estimation unit can be used to generate a composite restored image from the estimated phase image generated by the phase estimation unit and the respective amplitude image used for generating the estimated phase image. The at least one coherence unit can be thus configured and operable to determine the coherency based on the composite restored images constructed for the amplitude images.

Optionally, and in some embodiments preferably, the at least one coherence unit is configured and operable to compute cross-correlation between the two or more composite images based at least in part on their estimated phase images.

A yet another inventive aspect of the subject matter disclosed herein relates to a phase image estimator comprising at least two directional derivative units, each configured and operable to receive an amplitude image of a composite image and generate a different directional derivative image thereof, and a processing utility configured and operable to estimate a phase image of the composite image based on its directional derivative images. Optionally, the directional derivative units are implemented as modules of the processing utility.

In some embodiment the directional derivative units are configured and operable to compute different directional derivatives associated with different spatial image plane directions of the amplitude image. Optionally, and in some embodiments preferably, the image plane directions are orthogonal.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A and 1B schematically illustrate use of change detection techniques in interferometric imaging systems according to some possible embodiments, wherein FIG. 1A is a block diagram illustrating the CCD (coherent change detection) process and FIG. 1B illustrates acquisition and processing of composite (e.g., SAR) images;

FIGS. 2A to 2E schematically illustrate change detection techniques according to some possible embodiments;

FIGS. 5A to 5D are images illustrating experimental results obtained using a possible embodiment of the change detection technique disclosed herein, wherein FIGS. 5A and 5B show amplitude images of two SAR composite images taken in a time sequence of SAR images, FIG. 5C shows a coherency map generated from the original composite images, and FIG. 5D shows a coherency map generated from the restored images.

DETAILED DESCRIPTION OF EMBODIMENTS

Figure 1A:
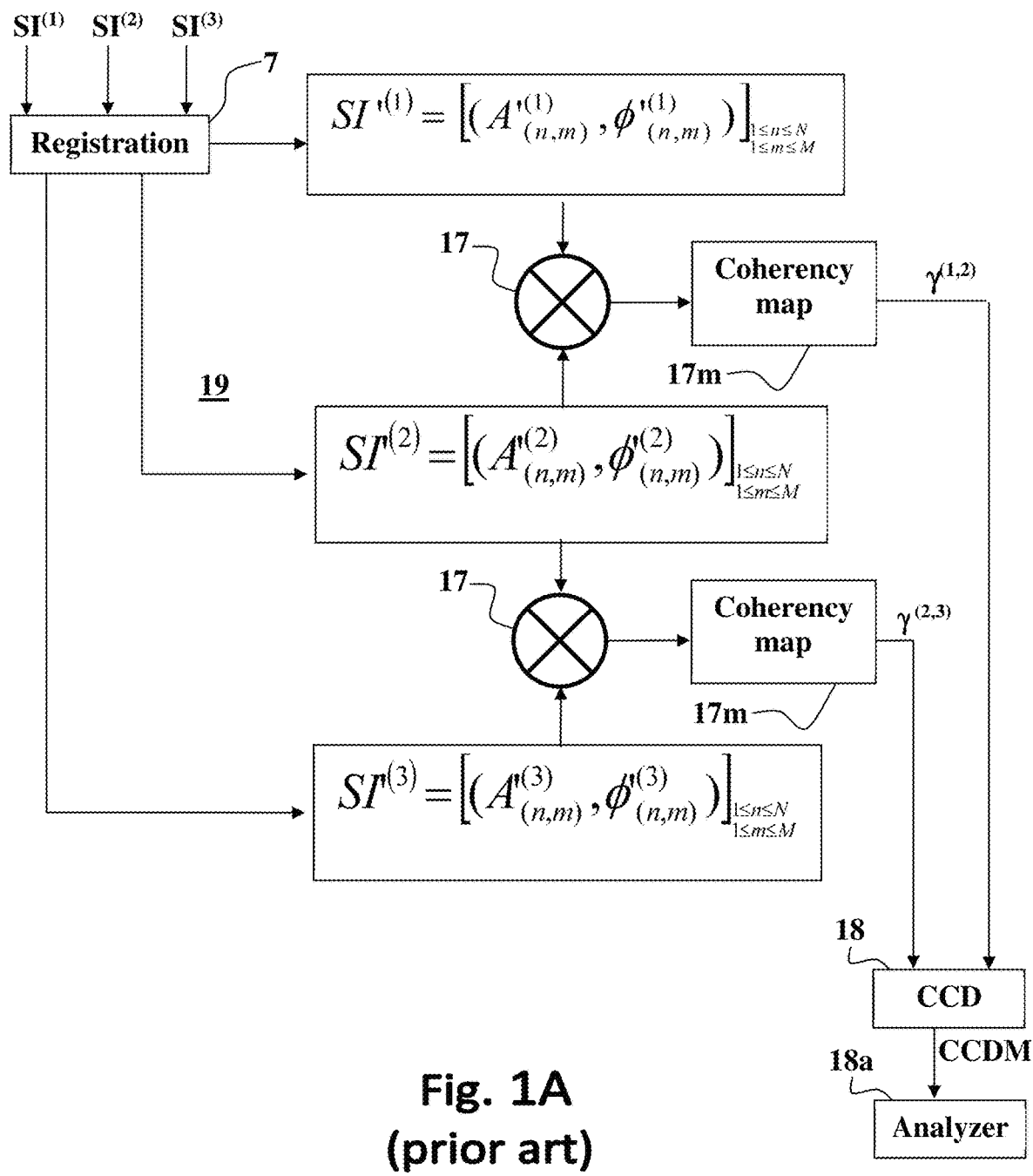

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The embodiments and examples disclosed herein below particularly relate to detection of changes occurring over time (also referred to as temporal decorrelation) in images created with side-scan synthetic aperture radar (SAR) systems. It is however noted that the present invention is not limited to side-scan SAR imaging systems, and embodiments of the present invention can be similarly used to detect changes in other types of imaging systems capable of producing composite images having a phase component, such as, but not limited to, interferograms, holograms, and other types of data images associated with phase information derived from an imaged ROI/terrain/object.

The CCD techniques disclosed herein involves computation of correlation between two or more pairs of SIs to determine temporal decorrelation between the SIs, being indicative of changes occurring over time in a ROI/object associated with the SIs. For example, SIs containing fields or forests typically reveal low coherence values due to the substantial amount of changes between SIs acquired over time, while SIs of urban areas typically yield high coherence values. CCD techniques are particularly suitable for SAR systems capable of providing high resolution images of a ROI/terrain/object over multiple side-scans conducted along a precise flight track with substantially good radiometric and geometric calibration, and geo-location accuracy.

In the CCD of SAR images temporal decorrelation between SIs of the same ROI is detected using the amplitude and phase data sets (images) of SIs acquired at different time instances/intervals. Since the amplitude and phase data of the SIs are sensitive to spatial changes in the scanned ROI/terrain/object, CCD of the SIs acquired with high level of repeat pass imaging geometry precision (i.e., from substantially the same trajectory) can detect very subtle changes (on a scale of a fraction of a wavelength—3 cm at X-band) in the scanned ROI/terrain/object at very long ranges. These include very small disturbances which are normally invisible in SAR amplitude imagery or optical imagery, such as footprints and vehicle tracks.

CCD can be performed using two or more co-registered SIs (i.e., the SIs can be mathematically warped to correct geometric differences and align their features) acquired over the same ROI/terrain/object at different time intervals and with substantially same imaging parameters. Standard CCD processing requires computation of the coherency level at the pixel level between different pairs of the SIs, and thus requires manipulation of complex data i.e., amplitude and phase image data of the SIs. The time intervals between the SIs acquisitions can be from a few minutes to many hours or days apart.

FIG. 1A is a block diagram 19 illustrating application of CCD to three composite images, $SI^{(1)}$ $SI^{(2)}$ and $SI^{(3)}$, each having a respective amplitude component ($A^{(1)}$, $A^{(2)}$, $A^{(3)}$) and phase component ($\phi^{(1)}$, $\phi^{(2)}$, $\phi^{(3)}$). Typically, before conducting the CCD, the composite images $SI^{(1)}$ $SI^{(2)}$ and $SI^{(3)}$ undergo an image registration step 7, which produces respective co-registered images, $SI'^{(1)}$ $SI'^{(2)}$ and $SI'^{(3)}$, each comprising respective co-registered amplitude image data $A'^{(i)}_{(m,n)}$ and phase image data $\phi'^{(i)}_{(m,n)}$ (where $1 \leq i \leq 3$, $1 \leq m \leq M$ and $1 \leq n \leq N$ are positive integers, M×N is the image size in pixels). The CCD process is then performed using the co-registered composite images, $SI'^{(1)}$ $SI'^{(2)}$ and $SI'^{(3)}$ i.e., using their co-registered amplitude $A'^{(i)}$ and phase $\phi'^{(i)}$ images, by generating from two different pairs of co-registered SIs, ($SI^{(1)}$, $SI^{(2)}$) and ($SI^{(2)}$, $SI^{(3)}$), two coherency maps 17m, $\gamma^{(1,2)}$ and $\gamma^{(2,3)}$, by the cross-correlation units 17.

The most common change statistic for CCD is the normalized sample coherence, or correlation coefficient (also known as magnitude of sample complex cross-correlation coefficient), given by—

$$\gamma^{(1,2)} = \frac{|\langle SI'^{(1)}SI'^{(2)*}\rangle|}{\sqrt{\langle SI'^{(1)}SI'^{(1)*}\rangle\langle SI'^{(2)}SI'^{(2)*}\rangle}} \quad (1)$$

where $SI'^{(1)}$ and $SI'^{(2)}$ are two co-registered SIs of the same ROI/terrain/object acquired with substantially same imaging parameters at two different time instances, t1 and t2, respectively (the $\langle\cdot\rangle$ operator is used to compute a local average e.g., using a 3×3 or 5×5 pixels moving window to determined local coherency level at a central pixel of the window, and '*' designates complex conjugation). Equation (2) show computation of the (m,n) pixel of the coherency map $\gamma^{(1,2)}$ using a B pixels window.

$$\gamma^{(1,2)}_{(m,n)} = \frac{\left|\sum_{k=1}^{N} SI'^{(1)}_k SI'^{(2)*}_k\right|}{\sqrt{\sum_{k=1}^{N}\left|SI'^{(1)}_k\right|^2 \sum_{k=1}^{N}\left|SI'^{(2)}_k\right|^2}} \quad (2)$$

The summation over k indicates averaging over a local two-dimensional window (e.g., for 3×3 window B=9) centered about the pixel $SI'^{(i)}_{(m,n)}$ of the images. Typically, the dimensions of the window range from 3×3 to 9×9. Correlation coefficient values $\gamma_{(m,n)}$ near 1.0 indicate a substantially unchanged reflectivity between the acquired images/passes i.e., high coherence, while correlation coefficient values $\gamma_{(m,n)}$ near 0.0 indicate significant changes in reflectivity of the acquired images/passes.

The coherency maps $\gamma^{(1,2)}$ and $\gamma^{(2,3)}$ generated by the cross-correlation units 17 undergo change detection in the CCD unit 18 which generates (e.g., by subtraction) a coherence change detection map CCDM indicative of areas of the imaged ROI/terrain/object in which changes occurred between the acquisition time intervals of the SIs. In this way the coherence change detection map CCDM generated by the CCD unit 18 can remove/ignore areas of the imaged ROI/terrain/object that exhibit decorrelation in all of the processed SIs (e.g., areas of vegetation, migrating sand, and suchlike), and which thus can be disregarded.

In some applications, CCD is used for real-time automatic detection of subtle changes in SIs, typically in surveillance/monitoring applications. In such applications the CCDM is processed by an analyzer module 18a configured to identify the regions in the CCDM exhibiting temporal decorrelation, and to correspondingly analyze the respective regions in the co-registered images, $SI'^{(1)}$ $SI'^{(2)}$ and $SI'^{(3)}$, to detect alerting events/conditions and/or targets therein. Implementing such real time CCD applications in SAR imaging systems typically requires widening data communication bands to allow fast transmission of the amplitude and phase data images of the acquired SIs, which increase costs, and physical and electrical loads, of the system.

Figure 1B:
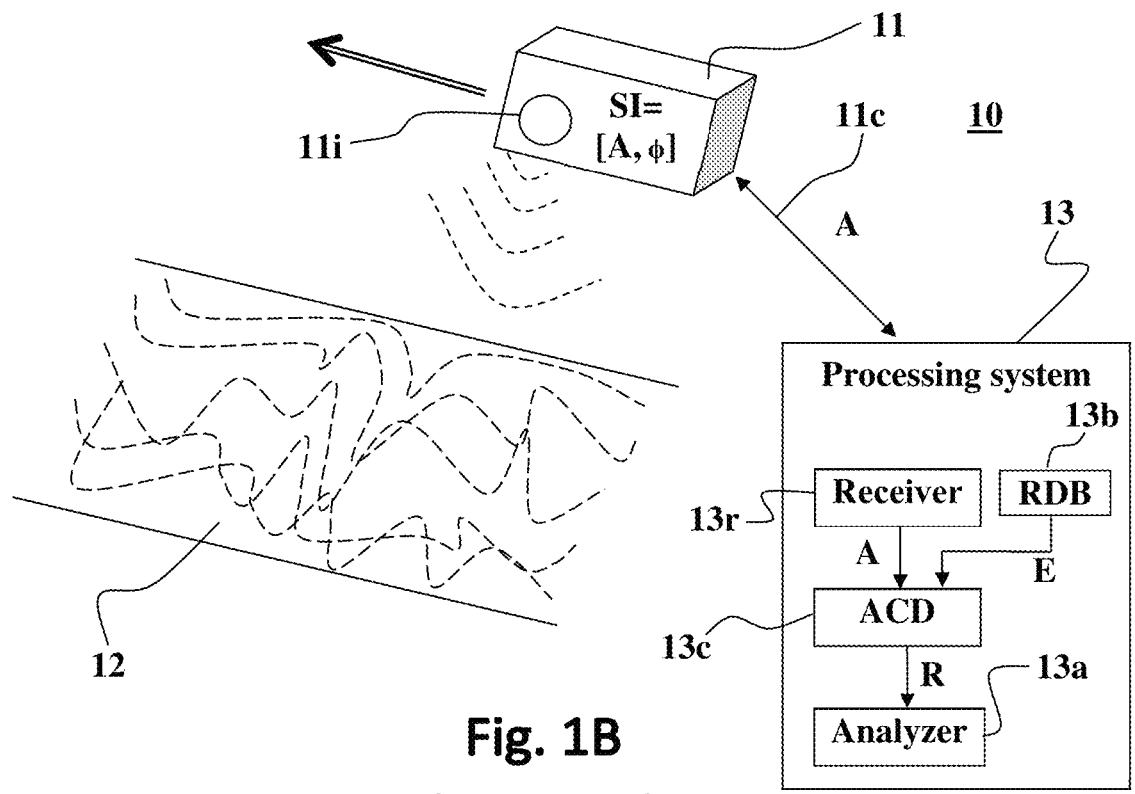

FIG. 1B schematically illustrates a real-time interferometry imaging system 10 utilizing a moving platform 11 (e.g., aircraft, spacecraft, watercraft) to acquire a composite image SI of a ROI/terrain/object 12 by an interferometry imaging system 11i mounted thereon. Operational airborne SAR systems generate the interferometric SAR images onboard the moving platform 11 by utilizing specialized real-time hardware and software. The onboard interferometric imaging system 11i generates the composite image SI, which data should be subsequently transmitted via a communication channel 11c to a remote ground station 13 (e.g., ground based exploitation station) for further processing and automatic exploitation.

However, the customary communication channels 11c of the carrying platform 11 are typically limited in their capacity/bandwidth, and thus not suitable for transmitting in real-time subsequently acquired composite SAR images SI e.g., both amplitude A and phase images φ cannot be transmitted in real-time because this requires at least twice the number of bits/pixels. Therefore, the data link channel 11c is typically used to transmit only the amplitude image data A of SI to the remote processing system 13, and in doing so the phase image information is lost/ignored, unless recorded onboard for later offline exploitation i.e., following the landing/harbor. Therefore the real time CCD processing of composite SI data at the ground station 13 is not practical, and in certain cases impossible, to achieve.

As exemplified in FIG. 1B, in possible applications the ground station 13 is configured to carry out incoherent amplitude change detection (ACD) 13c. In this example the ground station 13 comprises a receiver 13r configured to receive the amplitude image data A transmitted over the data link channel 11c which is then processed by the ACD module 13c that generates the ACD image R. The ACD image R can be then processed by the analyzer 13a for detection of changed areas/targets in the scanned ROI 12. The ACD analyzer 13c is designed to identify changes in the amplitude received signal e.g., the current amplitude image A relative to some reference image(s) E stored in a reference data base (RDB) 13b, e.g., obtained from previous reference amplitude images E residing in repository of previous amplitude images obtained over the same area 12. However, ACD cannot be used to detect subtle changes and disturbances as obtained utilizing the CCD techniques.

Embodiments of the present disclosure provides CCD techniques that use only the amplitude data images A of the acquired SIs to effectively detect changes, which thus can be used in real time with any interferometric (radar) imaging system utilizing the customary onboard communication infrastructure provided in the carrier platform (e.g., aircraft, spacecraft, watercraft) i.e., not requiring to upgrade data communication bands.

Figure 2A:
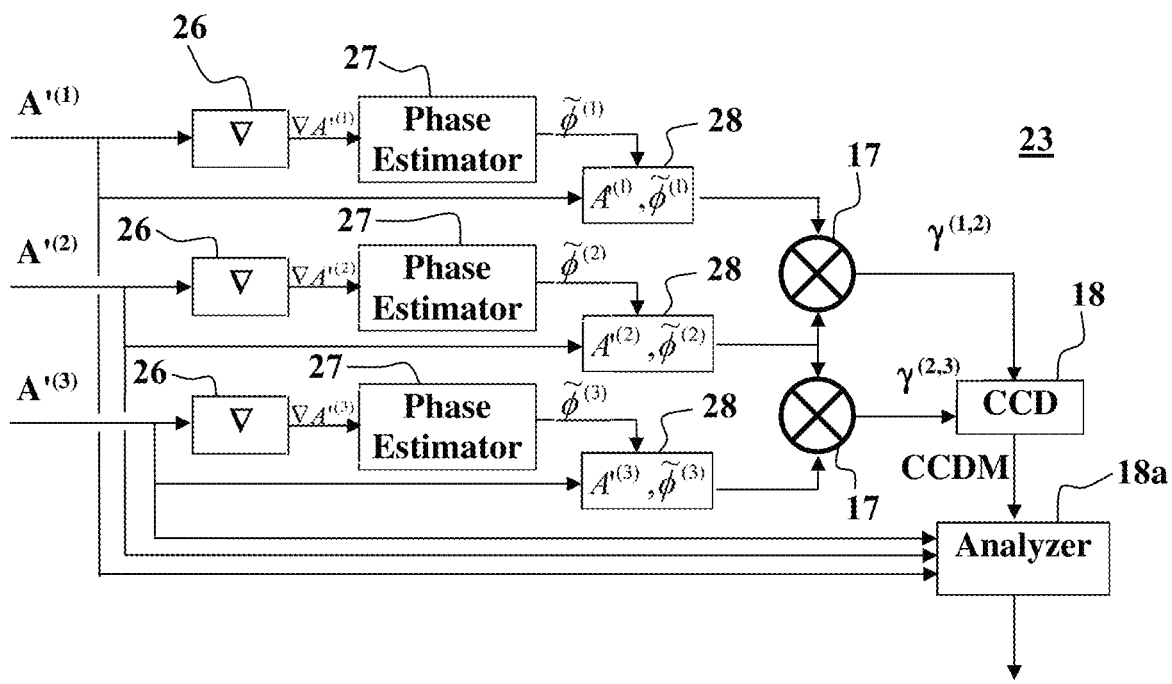

FIG. 2A is a block diagram of a change detection system 23 utilizing according to possible embodiments spatial gradient operators to estimate the phase image data of SIs, according to possible embodiments. The change detection system 23 is configured to simultaneously process the amplitude image data, $A'^{(1)}$ $A'^{(2)}$ and $A'^{(3)}$ (collectively referred to herein as $A'^{(i)}$), of three co-registered composite images, $SI'^{(1)}$ $SI'^{(2)}$ and $SI'^{(3)}$, but it may be easily adapted to simultaneously process greater numbers of SI's using the same principles, as described below. A spatial gradient operator is applied to each co-registered image $A'^{(i)}$ by a respective spatial gradient unit 26 configured to generate respective spatial gradient images $\nabla A'^{(i)}$ computed along a determined image plane direction. Each gradient image $\nabla A'^{(i)}$ is then processed by a respective phase estimation unit 27 configured to generate pseudo phase data $\tilde{\phi}_{(m,n)}^{(i)}$ for each pixel $\nabla A'^{(i)}_{(m,n)}$ of the gradient image based on the angles between its directional components.

The couplers 28 (also referred to herein as image restoring units) are used to couple between the co-registered amplitude data $A'^{(i)}$ of each image and its respective pseudo phase data image $\tilde{\phi}^{(i)}$ generated by the respective phase estimator 27, thereby producing respective restored composite image $(A'^{(i)}, \tilde{\phi}^{(i)})$ of the original co-registered SI. Different pairs of the restored composite images $(A'^{(i)}, \tilde{\phi}^{(i)})$ are then processed by the cross-correlation units (CCU) 17 configured to generate respective coherency maps $\gamma^{(i,i+1)}$. In this specific and non-limiting example, a first cross-correlation unit 17 receives a first pair of restored composite images, $(A'^{(1)}, \tilde{\phi}^{(1)})$ and $(A'^{(2)}, \tilde{\phi}^{(2)})$, and generates the coherency maps $\gamma^{(1,2)}$, and a second cross-correlation unit 17 receives a second pair of restored composite images, $(A'^{(2)}, \tilde{\phi}^{(2)})$ and $(A'^{(3)}, \tilde{\phi}^{(3)})$, and generates the coherency maps $\gamma^{(2,3)}$.

The coherency maps $\gamma^{(i,i+1)}$ generated by the cross-correlation units 17 undergo change detection in the CCD unit 18 configured to generate a coherency change detection map CCDM (e.g., by subtraction) indicative of the changes occurred in the imaged ROI/terrain/object 12 between the acquisition times of the SIs. In automated monitoring applications the coherency change detection map CCDM is processed by the analyzer unit 18a configured to identify and optionally display and/or alert about the areas in the co-registered SIs exhibiting the decorrelation.

FIG. 2B is a block diagram illustrating a CCD device 38 capable of detecting changes in an imaged ROI/terrain/object based on co-registered amplitude images $A'^{(1)}$, $A'^{(2)}$, and $A'^{(3)}$, of three sequentially acquired SIs, $SI^{(1)}$, $SI^{(2)}$, and $SI^{(3)}$. The phase generator 37 of CCD device 38 comprises three phase estimation channels, each configured to receive an amplitude image $A'^{(i)}$ (where $1 \leq i \leq 3$ is a positive integer) and generate a respective restored composite image $RI^{(i)}$ therefrom. Each phase generating channel comprises a pair of the directional image derivative units, $ID_{e1}$ and $ID_{e2}$ configured to generate two respective directional derivative images from one of the amplitude images $A'^{(i)}$, and a composite image restore unit 22 configured to generate the restored composite image $RI^{(i)}$ from the amplitude image $A'^{(i)}$ and its respective directional derivative images generated by the directional image derivative units $ID_{e1}$ and $ID_{e2}$.

The CCD device 38 comprises first and second cross-correlation (CCU) units 17, the first CCU unit 17 is configured to generate a first coherency map $\gamma^{(1,2)}$ from the first and second restored composite images $RI^{(1)}$ and $RI^{(2)}$, and the second CCU unit 17 is configured to generate a second coherency map $\gamma^{(2,3)}$ from the second and third restored composite images $RI^{(2)}$ and $RI^{(3)}$. A CDD unit 18 is then used to generate from the first and second coherency maps, $\gamma^{(2,2)}$ and $\gamma^{(2,3)}$, a coherency change detection map CCDM (by subtraction) that reveals the changes that occurred in the imaged ROI/terrain/object between the acquisition times of the three successive SIs i.e., all the changes between the respective SIs, $SI^{(1)}$, $SI^{(2)}$, and $SI^{(3)}$. In automated monitoring applications the coherence change detection map CCDM is processed by the analyzer unit 18a configured to identify and optionally display and/or alert about the areas in the co-registered SIs exhibiting the decorrelation.

Accordingly, the change detection carried out on three different consecutively acquired SIs of the same ROI/terrain/object remove from the final CCDM generated by the CCD 18 areas of the imaged ROI/terrain/object that constantly exhibit decorrelation in the consecutively acquired SIs (e.g., areas of vegetation and/or migrating sand), and which are in fact to be ignored. More particularly, such areas of the imaged ROI/terrain/object are continuously subject to changes, and thus they will show up in coherency maps $\gamma^{(i,i+1)}$, $\gamma^{(i+1,i+2)}$, . . . produced for a sequence of consecutively acquired SIs as areas exhibiting substantially high decorrelation. Therefore, the comparison/subtraction between each pair of consecutive coherency maps $\gamma^{(i,i+1)}$ and $\gamma^{(i+1,i+2)}$ performed by the CCD 18 cancels out these areas that continuously exhibit substantially high decorrelation, such that they don't show up in the final CCDM.

FIG. 2C is a block diagram illustrating a change detection device 24 configured to use for each newly received amplitude image data $A'^{(3)}$ of a SI of a certain ROI/terrain/object (12), restored composite images and coherency maps previously computed for amplitude images $A'^{(2)}$ and $A'^{(2)}$ previously acquired from the same ROI/terrain/object (12), for carrying out CCD. In this non-limiting example the system 24 performs CCD on three amplitude data images, $A'^{(2)} A'^{(2)}$ and $A'^{(3)}$ (collectively referred to herein as $A'^{(i)}$), of three co-registered interferometric images, $SI'^{(1)} SI'^{(2)}$ and $SI'^{(3)}$. The system 24 comprises a first coherency map generator 39 configured to process a first pair of amplitude images, $A'^{(1)}$ and $A'^{(2)}$, and generate a respective coherency map $\gamma^{(1,2)}$ therefrom, and an auxiliary coherency map generator 39' configured to generate a coherency map $\gamma^{(2,3)}$ for a second pair of amplitude images, $A'^{(2)}$ and $A'^{(3)}$.

Each coherency map generator comprises one or more phase generators 30 and a cross-correlation unit 17 configured and operable to receive from its respective phase generator 30 data of two restored composite images, $RI^{(i)}$ and $RI^{(i+1)}$, and generate a coherency map thereof $\gamma^{(i,i+1)}$ e.g., based on equation (1) and/or (2). Each phase generator 30 is configured to receive a co-registered amplitude image, $A'^{(i)}$, inputted into the coherency map generator, and determine for each amplitude image respective first directional derivative $\partial/\partial e1$ and second directional derivative $\partial/\partial e2$, which are used to construct a respective restored composite image $RI^{(i)}$ by the composite image restore unit 22.

A pair of directional image derivative (ID) units, $ID_{e1}$ and $ID_{e2}$, is used in each phase generator 30 to compute two different directional image derivatives, $\partial A'^{(i)}/\partial e1$ and $\partial A'^{(i)}/\partial e2$, of each co-registered amplitude image $A'^{(i)}$. The amplitude image $A'^{(i)}$ and its respective two directional derivative images $\partial A'^{(i)}/\partial e1$ and $\partial A'^{(i)}/\partial e2$ are used by the respective composite image restore unit 22 to construct a restored composite image $$RI^{(i)} = A'^{(i)} \cdot e^{j\tilde{\phi}^{(i)}}$$

for the amplitude image $A'^{(i)}$, where $\tilde{\phi}^{(i)}$ is the estimated phase image of the amplitude image $A'^{(i)}$. The cross-correlation units 17 generates from the restored composite images $RI^{(i)}$ and $RI^{(i+1)}$ the respective coherency map $\gamma^{(i,i+1)}$, and the coherency maps $\gamma^{(i,i+1)}$ and $\gamma^{(i+1,i+2)}$ are used by the CCD unit 18 to construct a coherency change detection map/image CCDM, used by the analyzer 18a for identification of areas in the imaged ROI/terrain/object (12) exhibiting high decorrelation values.

In this specific and non-limiting example a first phase generator 30 of the coherency map generator 39 uses a first composite image restore unit 22 to generate a first restored composite image $$RI^{(2)} = A'^{(2)} \cdot e^{j\tilde{\phi}^{(2)}}$$

from two different image plane directional derivatives of the amplitude image data $A'^{(2)}$, and a second phase generator 30 thereof uses a composite image restore unit 22 to generate a second complex image $$RI^{(1)} = A'^{(1)} \cdot e^{j\tilde{\phi}^{(1)}}$$

from two different image plane directional derivatives of the amplitude image data $A'^{(1)}$. The two restored composite images $RI^{(1)}$ and $RI^{(2)}$ are used by the CCU 17 of the first phase generator 30 to generate the coherency map $\gamma^{(1,2)}$.

The auxiliary coherency map generator 39' can be similarly configured to simultaneously generate a second coherency map $\gamma^{(2,3)}$ from the two amplitude images $A'^{(2)}$ and $A'^{(3)}$, using two respective phase generators 30 and a cross-correlation unit 17. As exemplified in FIG. 2C, in possible embodiments the auxiliary coherency map generator 39' is configured to receive the restored composite image $RI^{(2)}$ generated in the first coherency map generator 39, and thus can be configure to include a single phase generator 30 for generating the restored composite image $RI^{(3)}$ from the amplitude data image $A'^{(3)}$ of $SI^{(3)}$. Similarly, the system 24 can be modified to include one or more additional serially connected auxiliary coherency map generators 39', each configured to receive an amplitude data image $A'^{(j+1)}$ and a restored composite image $RI^{(i)}$ from a former auxiliary coherency map generators 39, and generate therefrom the coherency map $\gamma^{(i,i+1)}$.

This configuration of CDD device 24 can be efficiently used to process a sequence of co-registered amplitude data images, $A'^{(i)}, A'^{(i+1)}, A'^{(i+2)} \ldots$ of consecutively acquired SIs, such that upon receipt of a new amplitude data image $A'^{(j+2)}$ only the restored composite image $RI^{(i+2)}$ is generated for using it with the previously generated restored composite image $RI^{(i+1)}$ to generate the coherency map $\gamma^{(i+1,i+2)}$, which is then used with the previously generated coherency map $\gamma^{(i,i+1)}$ to carry out the CCD and generate a new CCDM. Accordingly, in some embodiments the system 24 comprises one or more memory units (not shown) for storing the previously generated restored composite images $RI^{(i)}$ and $RI^{(i+1)}$ and coherency map $\gamma^{(i,i+1)}$.

In some embodiments each pair of image directional derivative units, $ID_{e1}$ and $ID_{e2}$, is configured to determine a directional derivative along predefined spatial image plane directions, e1 and e2, respectively. Optionally, and in some embodiments preferably, the image plane directions e1 and e2 are orthogonal. Accordingly, in certain implementations the image plane directions e1 and e2 are defined along the horizontal ('x'-axis in FIG. 2D) and vertical ('y'-axis in FIG. 2D) directions of the amplitude images $A'^{(i)}$.

It is however noted that in other possible embodiments other image plane directions e1 and e2 can be used for generating the derivative images. For example, the image directional derivative units $ID_{e1}$ and $ID_{e2}$ can be configured to carry out directional derivatives in the orthogonal directions $e1^{(\alpha)}$ and $e2^{(\alpha)}$ exemplified in FIG. 2E, wherein the e1 and e2 directions shown in FIG. 2D are rotated by a degrees relative to the 'x'-'y' axes.

In some embodiments a plurality of pairs of directional derivative units $(ID_{e1}^{(\alpha 1)}, ID_{e2}^{(\alpha 1)})$, $(ID_{e1}^{(\alpha 2)}, ID_{e2}^{(\alpha 2)})$, $(ID_{e1}^{(\alpha 3)}, ID_{e2}^{(\alpha 3)})$, ... each configured to carry out directional derivatives in different orthogonal directions $e1^{(\alpha k)}$ and $e2^{(\alpha k)}$ (k=1, 2, 3, ... is an integer), are used with a respective plurality of composite image restore units 22 to generate for each amplitude image $A'^{(i)}$ a respective plurality of restored images $RI^{(i)}_{(\alpha 1)}, RI^{(i)}_{(\alpha 2)}, RI^{(i)}_{(\alpha 3)}, \ldots$. For each pair of RIs obtained using directional derivatives in certain orthogonal directions $e1^{(\alpha k)}$ and $e2^{(\alpha k)}$ a corresponding coherence map is obtained. Thus for each pair of RIs, $RI^{(i)}$ and $RI^{(i+1)}$, a set of coherence maps $\gamma^{(i,i+1)}_{(\alpha 1)}, \gamma^{(i,i+1)}_{(\alpha 2)}, 7\gamma^{(i,i+1)}_{(\alpha 3)}, \ldots$ are generated, one for each directional ($\alpha$k) derivative used. Averaging among the coherence maps obtained $\gamma^{(i,i+1)}_{(\alpha 1)}, \gamma^{(i,i+1)}_{(\alpha 2)}, \gamma^{(i,i+1)}_{(\alpha 3)}, \ldots$ for each orthogonal direction k above, would yield an improved resultant coherence map. In some possible embodiments the image directional derivative units $ID_{e1}$ and $ID_{e2}$ are configured to generate the directional derivative images using one or more of the following: Sobel operator, prewitt operator, Roberts cross operator, differential operators, and complex wavelets decompositions.

Figure 3:
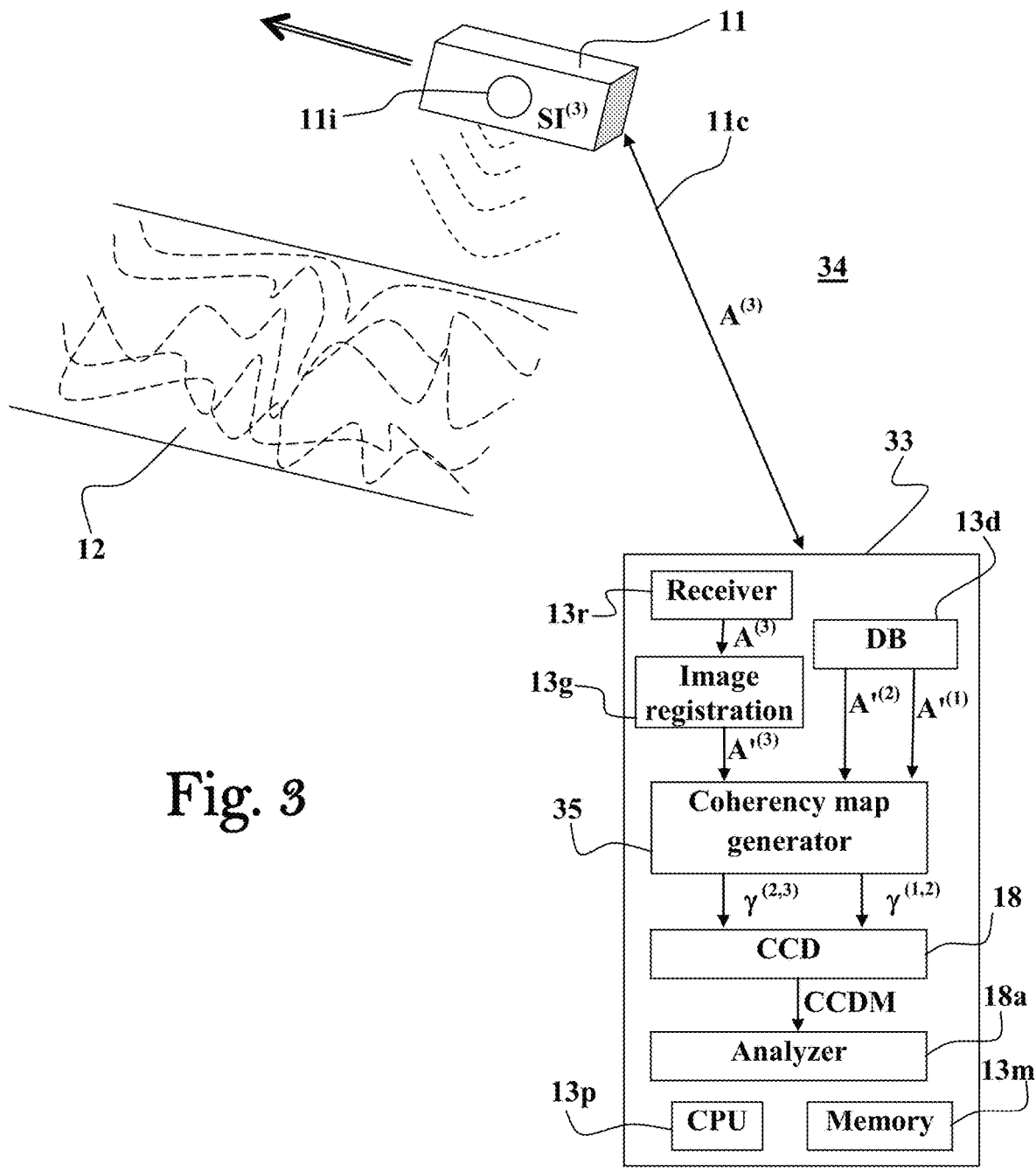
FIG. 3 schematically illustrates a system employing a change detection technique according to some possible embodiments.

FIG. 3 schematically illustrates a system 34 for carrying out CCD using amplitude images of SIs, according to some possible embodiments. The system 34 comprises the moving platform 11 carrying the interferometry imaging system 11i configured to acquire a side-scan $SI^{(3)}$ of the ROI/terrain/object 12, and transmit the amplitude image $A^{(3)}$ of the acquired side-scan $SI^{(3)}$ to the ground control system 33. The ground system 33 comprises a database 13d of SIs of the same ROI/terrain/object 12 previously acquired using substantially the same imaging parameters, a receiver 13r, an image registration unit 13g, the coherency map generator 35, and the CCD unit 18. In automated CCD applications the ground system 33 can further comprise the analyzer unit 18a.

The amplitude image data $A^{(3)}$ of the recently acquired $SI^{(3)}$ transmitted over the data communication link 11e (e.g., using lossless compression techniques) is received by the receiver 13r of the ground system 33 and transferred to the image registration unit 13g. The image registration unit 13g is configured to process the amplitude image data $A^{(3)}$ from the receiver 13r and generate therefrom a respective co-registered amplitude image $A'^{(3)}$, co-registered with at least two other amplitude images, $A'^{(2)}$ and $A'^{(1)}$, of the previously acquired $SI^{(2)}$ and SIT. As exemplified in FIG. 3, the co-registered amplitude images $A'^{(1)}$ and $A'^{(2)}$, of the previously acquired $SI^{(2)}$ and $SI^{(1)}$ may be stored in a database of images 13d of the ground station 33.

The co-registered amplitude images $A'^{(3)}$, $A'^{(2)}$ and $A'^{(1)}$, are used by the coherence map generator 35 to generate two coherency maps, $\gamma^{(1,2)}$ and $\gamma^{(2,3)}$, using any one of the techniques described hereinabove and hereinbelow for generating pseudo phase images from the amplitude data images of the acquired SIs, such as shown in FIGS. FIGS. 2A, 2B and 2C. The coherency maps $\gamma^{(1,2)}$ and $\gamma^{(2,3)}$ are then used by the CCD unit 18 to generate the coherency change detection map CCDM.

As will be exemplified below with reference to FIGS. 5A to 5D, the coherency maps $\gamma^{(i,i+1)}$ generated by embodiments disclosed herein can be used to detect most of the subtle changes detectable by the coherency change detection maps generated by applying the CCD to the amplitude and phase images of the original SIs, $SI^{(1)}$ $SI^{(2)}$ and $SI^{(3)}$. It therefore follows that the CCD systems according to possible embodiments described herein are capable of performing automated CCD in real time using only transmitted amplitude images $A^{(i+1)}$ of acquired SIs, and providing coherency maps $\gamma^{(i,i+1)}$ that are substantially comparable, in their ability to detect changes in the scanned ROI/terrain/images 12, to the "off-line" coherency change detection maps obtained using the amplitude and phase images of the original SIs.

In some embodiments one or more of the various components of the ground system 33 are implemented as software modules operated by means of one or more processing units 13p and memory units 13m. Alternatively, one or more of the components of the processing system 33 are implemented by hardware, or by a combination of software and hardware.

Figure 4:
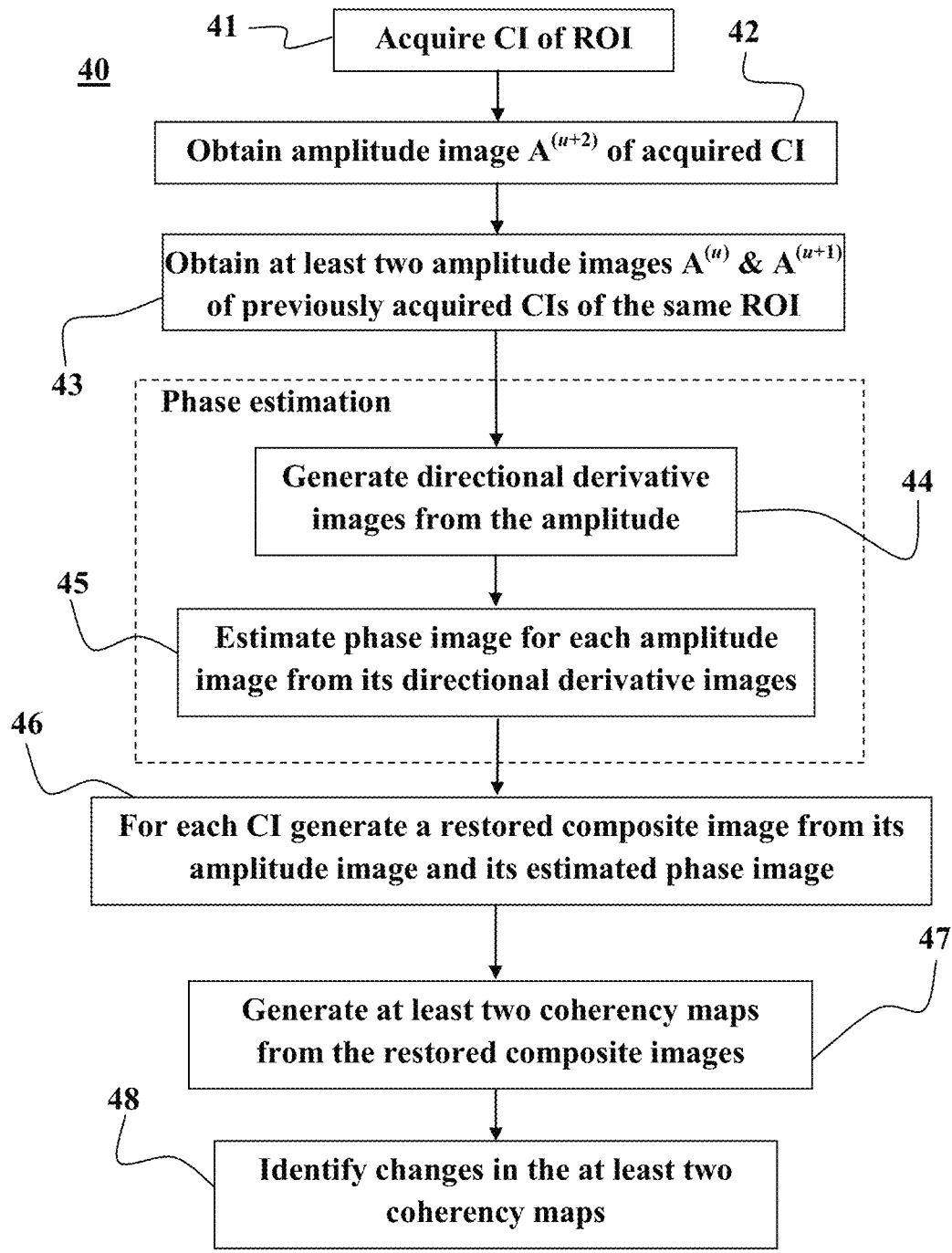
FIG. 4 is a flowchart of a change detection process according to some possible embodiments.

FIG. 4 is a flowchart of a CCD process 40 according to some possible embodiments. The CCD process 40 is commenced in the acquisition of a CI of an imaged ROI/terrain/object in step 41, and provision of its amplitude image in step 42. Next, in step 43 at least two amplitude images of CIs of the same ROI/terrain/object, previously acquired with substantially the same imaging parameters, are obtained, and in steps 44 and 45 a pseudo phase image is estimated for each of the amplitude images obtained in steps 42 and 43, using any one of the techniques described hereinabove and hereinbelow. In this specific process, in step 44 directional derivative images are generated from the amplitude images obtained in steps 42 and 43, and in step 45 a phase image $$\left(\tilde{\phi} = tg^{-1}\left(\frac{\partial A}{\partial e1} \Big/ \frac{\partial A}{\partial e2}\right)\right)$$

is estimated for each CI from its directional derivative images. In step 46 a restored composite image is constructed for each amplitude image using the amplitude image and its respective directional derivative images. In step 47 at least two coherency maps are generated from the restored composite images generated in step 47. The coherency maps can be then analyzed in step 48 e.g., using standard CCD, to detect therein areas/targets exhibiting high level of decorrelation. Additionally, or alternatively, changes can be identified in step 48 by generating a CCDM from the coherency maps, and analyzing the obtained CCDM.

It is noted that the steps of the methods/processes described herein may be performed in any order or simultaneously, unless it is clear from the context that one step depends on another being performed first.

Figure 5A:
Figure 5B:

FIGS. 5A to 5D provide comparative results obtained using a possible embodiment of the present disclosure. FIGS. 5A and 5B show amplitude images, 51 and 52 respectively, of two different SAR CIs of the same imaged ROI/terrain acquired using substantially the same imaging parameters.

Figure 5C:
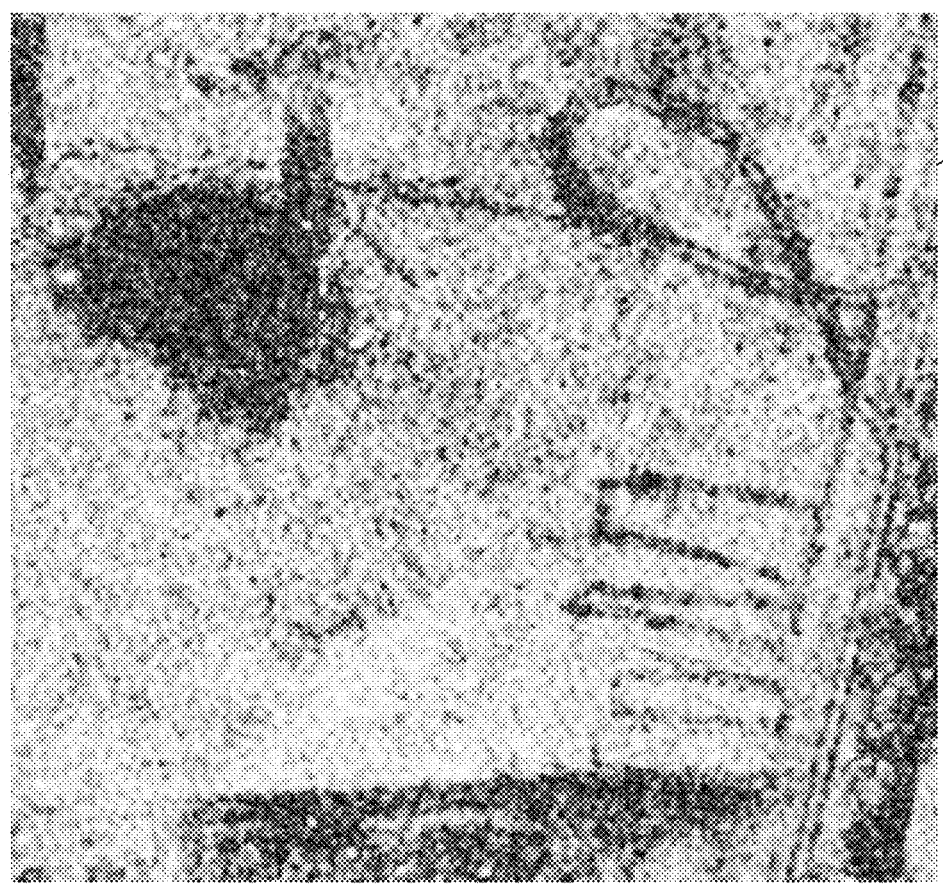
Figure 5D:
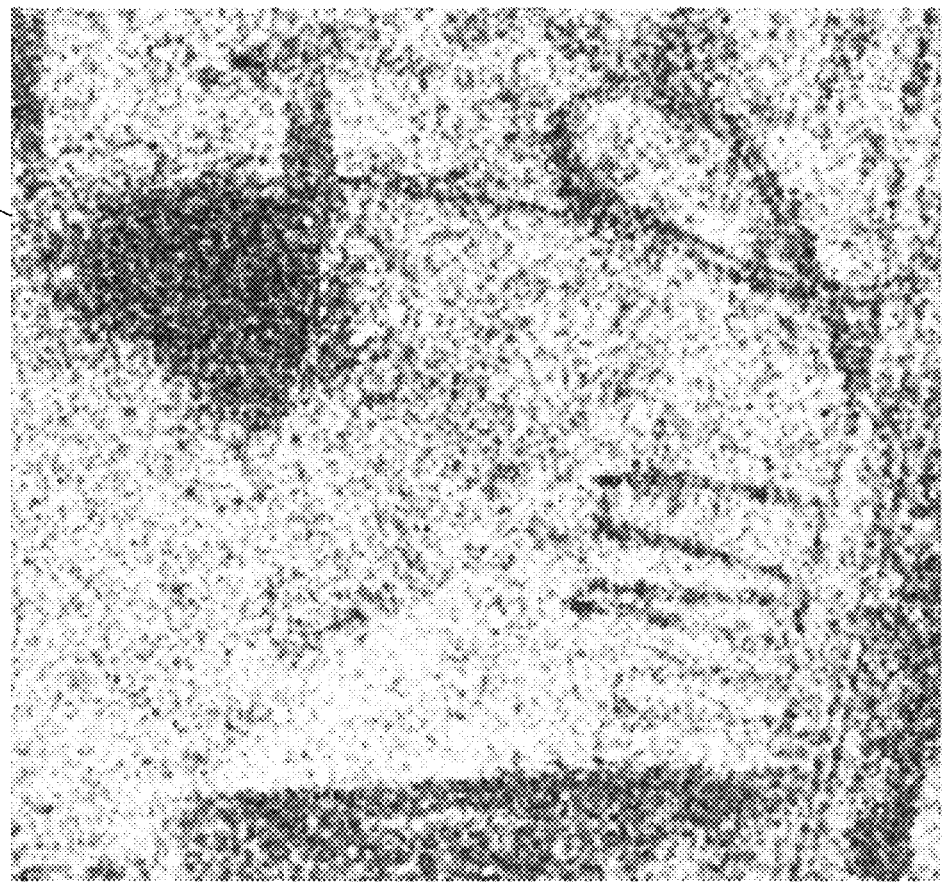

FIG. 5C shows a coherency map/image 53 generated using the amplitude and phase image data of the two CIs which amplitude images 51 and 52 are shown in FIGS. 5A and 5B respectively, using the conventional CCD approach i.e., by applying equation (1) and/or (2) on the original amplitude and phase image data, and FIG. 5D shows a coherency map/image 54 generated using only the amplitude images of the CIs according to a possible embodiment.

As seen, there is great similarity between the coherency map 53 of FIG. 5C, that was generated using the original CIs, and the coherency map 54 of FIG. 5D that was generated using the RIs, despite their different inputs. All changes seen in the coherency map/image 53 generated using the conventional CCD approach are also detectable in the coherency map/image 54 generated using only the amplitude images as disclosed herein.

It is noted that embodiments disclosed herein can be used to effectively conduct CCD by analyzing a coherency map generated from two amplitude images, as described hereinabove. The use of a third amplitude image for the generation of a CCDM is optionally used in some embodiments to bring forward meaningful changes between the images and cancel out non-significant changes (i.e., that occur in all acquired images), and thereby facilitate the analysis of the change between the images.

Implementations of the invention disclosed herein enable conducting effective change detection using datasets of substantially reduced sizes, with minor reduction in sensitivity, and thus entails reduction of system costs and energy consumption, and overall acceleration of image analysis processes. Embodiments of the present invention can be used in a wide range of applications. For example, and without being limiting, detection of subtle terrain changes usable for agriculture fields control systems, forests damage identification, surveillance and inspection (e.g., port and harbor security).

Functions of the CCD device and system described hereinabove may be controlled through instructions executed by a computer-based processing system. A processing system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing SAR CI images data, directional derivative images, coherency maps, and/or other data, computer programs or other instructions, to be loaded into the computer system of the processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

For example, computer programs (e.g., computer control logic) may be loaded from the secondary memory into a main memory for execution by one or more processors of the processing system. Alternatively or additionally, computer programs may be received via a communication interface. Such computer programs, when executed, enable the computer system to perform certain features of the present invention as discussed herein. In particular, the computer programs, when executed, enable a processor to perform and/or cause the performance of features of the present invention. Accordingly, such computer programs may implement controllers of the processing system.

In an embodiment where the invention is implemented using software, the software can be stored in a computer program product and loaded into the computer system using the removable storage drive, the memory chips or the communications interface/link. The control logic (software), when executed by a processor, causes the processor to perform certain functions of the invention as described herein.

Features of the invention can be implemented primarily in hardware using, for example, hardware components such as application specific integrated circuits (ASICs) or field-programmable gated arrays (FPGAs). Implementation of the hardware of state machine(s) to perform the functions described herein will be apparent to persons skilled in the relevant art(s). Features of the invention can be implemented alternatively using a combination of both hardware and software.

As described hereinabove and shown in the associated figures, embodiments of the present invention can be used to implement a CCD device and/or system, and related computer implemented methods, that does not require phase image data of acquired imagery. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A computer implemented method of determining coherency between composite images having phase and amplitude components, the method comprising:
providing first and second amplitude images indicative of amplitude values of pixels of a respective first and second composite images;
generating, for said first and second amplitude images, respective first and second restored images indicative of a pseudo phase images thereof, said generating comprising applying to each of said first and second amplitude images a first directional derivative operator and a second directional derivative operator thereby generating for each of said amplitude images respective first directional derivative image and second directional derivative image thereof, and estimating said first and second pseudo phase images of the first and second restored images by computing an angle between the respective first and second directional derivative components at each pixel of said first and second amplitude images; and
generating a coherency map based at least on the first and second restored images associated with said first and second amplitude images by determining a cross-correlation between said first and second restored images, said first coherency map being indicative of decorrelation between said first and second composite images.

2. The method of claim 1, comprising:
providing at least one additional amplitude image indicative of amplitude values of pixels of at least one additional composite image, applying said first directional derivative operator and said second directional derivative operator to said at least one additional amplitude image thereby generating respective additional first directional derivative image and additional second directional derivative image thereof; and
generating at least one additional coherency map based at least on said additional first directional derivative image and said additional second directional derivative image of said at least one additional amplitude image and at least one of the directional derivative images of the first amplitude image or of the second amplitude image, said at least one additional coherency map being indicative of decorrelation between said at least one additional composite image and said first or second composite images.

3. The method of claim 2, comprising generating a coherency change detection map from the first and the at least one additional coherency map, said coherency change detection map being indicative of decorrelation between said first, second, and third, composite images and configured to substantially cancel out areas exhibiting continuous decorrelation in all of the composite images.

4. The method of claim 3, comprising processing and analyzing the coherency change detection map to identify regions and/or objects of interest therein.

5. The method of claim 1, comprising applying a plurality of pairs of the first directional derivative operator and the second directional derivative operator to the amplitude image of at least one of the composite images, each of said pair of directional derivative operators being applied in different image directions, and generating a coherency map based on said plurality of pairs of the first directional derivative operator and the second directional derivative operator.

6. The method of claim 5, wherein the image directions of each pair of the directional derivative operators are orthogonal.

7. The method of claim 1, wherein the directions of the directional derivative operators are orthogonal.

8. The method of claim 7, wherein the directions of the derivative operators are on horizontal and vertical axes of their respective amplitude images.

9. The method of claim 1, wherein generation of at least one of the coherency maps comprises computing complex cross-correlation.

10. The method of claim 1, comprising spatially registering the amplitude components of the composite images with respect to one another.

11. The method of claim 1, wherein the composite images are coherent SAR or coherent SAS images.

12. A system for determining decorrelation between two or more composite images, each of said composite images having an amplitude component and a phase component, the system comprises one or more processors and memory and is configured for providing first and second amplitude images indicative of amplitude values of pixels of respective first and second composite images and processing said first and second amplitude images to determine decorrelation between said first and second composite images; said processing comprises:
generating, for said first and second amplitude image, respective first and second restored images indicative of a pseudo phase images and respective one of first and second amplitude images, said generating comprises applying to each of said first and second amplitude images a first directional derivative operator and a second directional derivative operator, thereby generating for each of said amplitude images respective first directional derivative image and second directional derivative image thereof, and estimating said first and second pseudo phase images of the first and second restored images by computing an angle between the respective first and second directional derivatives components at each pixel of said first and second amplitude images; and generating a coherency map based at least on the first and second restored images associated with said first and second amplitude images by determining a cross-correlation between said first and second restored images, said coherency map being indicative of decorrelation between said first and second composite images.

13. The system of claim 12, wherein said one or more processor is further configured for processing data on first, second and third amplitude images, said processing further comprising estimating first, second and third pseudo phase images, thus generating at least first, second and third restored images for respective three amplitude images of three different composite images, and generating two coherency maps based on said first, second and third restored images, each coherency map being indicative of coherency between a different pair of said three different composite images based at least on their respective estimated phase images.

14. The system of claim 13 comprising at least one change detector configured and operable to generate a coherency change detection map based on the data generated by the two coherence data generators, said coherency change detection map being indicative of changes between at least two of the three different composite images, and substantially cancels out areas exhibiting high decorrelation in all of the composite images.

15. The system of claim 12, wherein said one or more processors comprises at least one phase estimator, said phase estimator comprising first directional differentiator and second directional differentiator configured and operable to generate respective first directional derivative image and second directional derivative image of an amplitude image.

16. The system of claim 15, wherein said one or more processors comprises a composite image restorer associated with said at least one phase estimator, said composite image restorer configured and operable to generate a restored composite image from the first directional derivative image and the second directional derivative image and the respective amplitude image.

17. The system of claim 12, wherein said one or more processors comprises at least one coherence data generator configured and operable to determine the coherency based on the restored composite images generated for each amplitude image.

18. The system of claim 12, wherein said one or more processors comprises at least one coherence data generator configured and operable to compute cross-correlation between the two or more composite images based at least on their estimated phase images.

* * * * *